United States Patent Office 3,780,127
Patented Dec. 18, 1973

---

3,780,127
CATALYTIC PROCESS FOR DEHYDRATION OF ALCOHOLS
Frank G. Young, Charleston, and Leroy R. Pennington, Winfield, W. Va., assignors to Union Carbide Corporation, New York, N.Y.
No Drawing. Filed Oct. 2, 1972, Ser. No. 293,767
Int. Cl. C07c 1/24
U.S. Cl. 260—682         9 Claims

ABSTRACT OF THE DISCLOSURE

A process for the dehydration of alcohols, e.g., of ethanol to produce ethylene comprising vaporizing ethanol in the presence of a non-linear polymer catalyst composition consisting essentially of a recurring unit having the following structural formula:

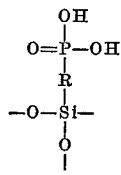

wherein R is an unsubstituted or substituted straight or branched chain divalent saturated alkylene radical having 2 to 10 carbon atoms or an unsubstituted or substituted divalent aryl radical having 1 to 3 benzene rings wherein the substituents for the alkylene radical can be halogen or a phenyl radical and the substituents for the aryl radical can be halogen or straight or branched chain saturated alkyl radicals having 1 to 5 carbon atoms; and recovering ethylene.

FIELD OF THE INVENTION

This invention relates to a catalytic process for the dehydration of an alcohol to produce an olefin and, more particularly, to the catalytic dehydration of ethanol to provide ethylene.

DESCRIPTION OF THE PRIOR ART

The catalytic dehydration of alcohols to provide olefins is a well-known process; however, the catalysts used heretofore have, generally, suffered from undesirable dehydrogenation or condensation activity. Further, increased productivity (turnover) and thermal stability in a particular process environment is continually sought after in the realm of industrial processing.

SUMMARY OF THE INVENTION

An object of this invention, therefore, is to provide a catalytic process for the dehydration of alcohols to provide olefins wherein the catalyst does not suffer from undesirable condensation or dehydrogenation activity; and the productivity (turnover) and thermal stability of the catalyst in the process environment are exemplary with respect to prior art processes.

Other objects and advantages will become apparent hereinafter.

According to the present invention, a process has been discovered which meets the aforementioned object comprising vaporizing an alcohol in the presence of a non-linear polymer catalyst composition consisting essentially of a recurring unit having the following structural formula:

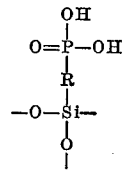

wherein R is an unsubstituted or substituted straight or branched chain divalent saturated alkylene radical having 2 to 10 carbon atoms or an unsubstituted or substituted divalent aryl radical having 1 to 3 benzene rings wherein the substituents for the alkylene radical can be halogen or a phenyl radical and the substituents for the aryl radical can be halogen or straight or branched chain saturated alkyl radicals having 1 to 5 carbon atoms; and recovering an olefin.

DESCRIPTION OF THE PREFERRED EMBODIMENT

The process for dehydration of an alcohol to an olefin is, except for the catalyst advantageously used therein, conventional.

The catalyst chamber in the reactor is brought up to a temperature in the range of about 150° C. to about 350° C. and preferably about 200° C. to about 300° C. The alcohol is vaporized and then passed over the catalyst, the reactor being maintained at a temperature in the range of about 150° C. to about 350° C. and preferably in the range of about 200° C. to about 300° C. and at a pressure in the range of about −15 p.s.i.g. to about +100 p.s.i.g. and preferably in the range of about 0 p.s.i.g. to about 15 p.s.i.g. The feed to the reactor enters at a temperature in the range of about 150° C. to about 350° C. and the effluent comprised, for example, of ethylene, water, and ethyl ether leaves the reactor at a temperature in the range of about 150° C. to about 350° C. Separation is effected by partial condensation and fractional distillation.

Any alcohol can be used in the within process providing it has an alpha hydrogen, i.e., a hydrogen atom attached to a carbon atom adjacent to a carbon atom bearing a hydroxyl group, e.g.,

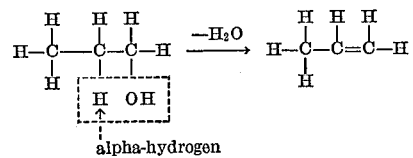

alpha-hydrogen

As a practical matter, the alcohols can have from two to eighteen carbon atoms, and can be alkyl alcohols, cycloalkyl alcohols, and aralkyl alcohols. They can also be saturated or unsaturated, the alkyl groups can be straight or branched chain, and the alcohols can be substituted alcohols, examples of substituents being groups such as halogen, nitro, cyano, and carbonyl.

Examples of alcohols which can be used are ethyl alcohol, n-propyl alcohol, isopropyl alcohol, n-butyl alcohol, isobutyl alcohol, sec-butyl alcohol, n-amyl alcohol, isoamyl alcohol, cyclopentanol, n-hexyl alcohol, cyclohexanol, n-octyl alcohol, capryl alcohol, n-decyl alcohol, lauryl alcohol, myristyl alcohol, cetyl alcohol, and stearyl alcohol. Corresponding olefins can be produced by the process such as ethylene, propylene, butene-1, butene-2, isobutylene, pentene-1, 2-methylbutene-1, 3-methylbutene-1, hexene-1, heptene-1, octene-1 and cyclohexene. By-products of the process are the corresponding ethers.

The non-linear polymer catalyst composition used in the reactor is defined above. The polymer, of which the catalyst composition consists essentially, may be called a poly-silsesquioxane and the recurring unit may be referred to as a silsesquioxane. It is prepared by conventional hydrolysis of a precursor; however, in this case, the effect of hydrolysis is to hydrolytically polymerize the precursor, which is described in more detail below.

The hydrolysis can be accompanied by simply admixing the precursor with water and heating at temperatures in the range of about 25° C. to about 200° C. at atmospheric or higher pressures. Refluxing the mixture is a practical way of accomplishing this. Other mediums of hydrolysis can be used such as water containing acid or alkalies, and polar organic solvents containing dissolved water, acids, or bases. The resulting polymer, the subject of this invention, is generally a glassy solid having the various characteristics noted below.

The hydrolysis can be accomplished by simply admixing hydrolyzable radicals of the precursor; however, these radicals are difficult to distinguish by analysis especially in the polymers of higher molecular weight. The non-linearity of the polymer contributes to the difficulty, which is compounded when cross-linking agents are used. Cross-linking will be discussed further hereinafter.

The preparation of the polymer can be exemplified by the following reaction:

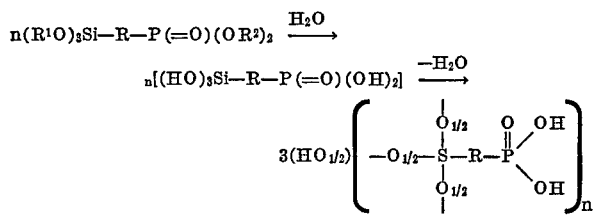

wherein R is as defined above, the subscript $n$ is the theoretical number of recurring units, and $R^1$ and $R^2$ are hydrogen or any organic, organometallic, or inorganic radical selectively hydrolyzable at the $R^1$—O or the $R^2$—O bonds wherein the organic and organometallic radicals are monovalent and the inorganic radical is in an oxidation state of $+1$, said radicals being devoid of functional groups, which would inhibit hydrolysis at the $R^1$—O or $R^2$—O bonds. The entire $R^1$—O radical can be replaced by a halogen if desired. Chlorine, particularly gives good results.

The only $R^1$ or $R^2$ radicals which remain, if any, in the polymer are those in endblocking positions. The balance of the $R^1$ and $R^2$ radicals are, of course, hydrolyzed and, in that form, are eventually separated from the desired product as, e.g., sodium hydroxide or ethyl alcohol. Defining $R^1$ and $R^2$ is exceedingly difficult since it is hard to conceive of a radical which, if hydrolyzable, could not be used here. The simplest $R^1$ and $R^2$ radicals included, other than hydrogen, are straight or branched chain substituted or unsubstituted alkyl radicals having 1 to 10 carbon atoms, e.g., methyl, ethyl, and isopropyl. On the inorganic side, elements of Group 1a of the Periodic Table, e.g., sodium, potassium, or lithium, are representative. Other examples of such radicals are acetyl, $CH_3CO$—, and phenyl, $C_6H_5$—.

R is defined as an unsubstituted or substituted straight or branched chain divalent saturated alkylene radical having 2 to 10 carbon atoms or an unsubstituted or substituted divalent aryl radical having 1 to 3 benzene rings wherein the substituents for the alkylene radical can be halogen or a phenyl radical and the substituents for the aryl radical can be halogen or straight or branched chain saturated alkyl radicals having 1 to 5 carbon atoms. Examples of R radicals are

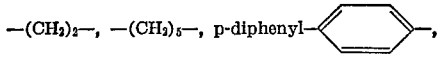

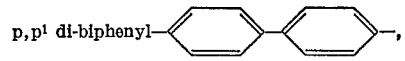

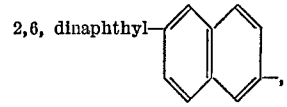

and 2,6 dianthralene 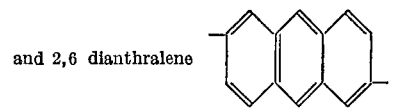

A substituent for the alkylene or aryl radicals can also be

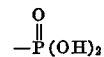

It should be noted that the limited definition of R mentioned heretofore is arbitrary and merely selected in order to reduce the complexity of the polymer. Theoretically, there is no reason why the number of carbon atoms or benzene rings cannot be doubled or tripled with similar results.

The number of recurring units or molecular weight of the polymer is, in view of its non-linearity, difficult to ascertain. Generally, the number of units will range from about 3 to 1000 and the molecular weight from about 750 to about 300,000. The objective, however, is to provide a solid polymeric catalyst composition which is insoluble in the reaction medium in which it will be used. Higher molecular weights where desired can be provided by heating the hydrolyzed products at temperatures of between 100° C. and 300° C. for longer periods of time. In the same vein, mixed compositions of one or more polymers of varying size and complexity can be used to provide the catalyst.

The polymer used in the process of this invention is a non-linear or branched polymer, the most commonly occurring bond being between Si and O. As noted, sufficient $R^1$ and/or $R^2$ radicals may remain on hydrolysis to endblock or terminate the polymer. Mixtures of precursors can be used to prepare the polymer, if desired, although this is not preferred.

As mentioned heretofore, cross-linking agents such as tetrafunctional silicate esters can be cohydrolyzed with the precursor. The resulting copolymer will contain cross-linked units represented by the following structural formula:

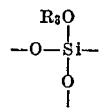

wherein $R^3$ can be defined as hydrogen or an unsubstituted or substituted straight or branched chain or cyclic monovalent saturated alkyl radical having 1 to 10 carbon atoms or an unsubstituted or substituted monovalent aryl radical having 1 to 3 benzene rings wherein the substituents for the alkyl radical can be halogen or a phenyl radical and the substituents for the aryl radical can be halogen or straight or branched chain saturated alkyl radicals having 1 to 5 carbon atoms. Again, in the broadest sense the $R^3$ radical should be one that does not contain any functional groups which would interfere. Examples of $R^3$ radicals methyl, ethyl, phenyl, benzyl, or cyclohexyl. The cross-link units can be present in amounts of about 1 to about 20 mol percent. This is simply derived by cohydrolyzing cross-linking agents in an amount of about 1 to 20 mol percent based on the number of mols of precursor hydrolyzed. The use of the cross-linking agent increases the hardness of the polymer, its thermal stability, and reduces the number of phosphorus atoms in the final polymer where lower activity is desired. A preferred amount of cross-linking agent is about 5 to about 15 mol percent. End-blocking is theoretically the same as for the poly-silsesquioxane. Examples of cross-linking agents are tetraethyl orthosilicate, tetraphenyl orthosilicate, silicon tetrachloride, and methyl trichlorosilane. The cross-link units are randomly interspersed among the units of the polymer.

The described polymer can be considered a silicate backbone carrier polymer and an alternative formula for the recurring unit can be written as follows:

$$-O_{3/2}Si-R-P(=O)(OH)_2$$

wherein the numerator 3 designates the residual functionality of Si, i.e., the number of oxygen atoms, and the denominator 2 designates that each oxygen is shared, generally, with another Si atom.

Examples of the polymer catalysts of this invention are poly-3-phosphonopropyl - polysilsesquioxane (hereinafter referred to as SPPA) and poly-3-phosphonoethylpolysilsesquioxane (hereinafter referred to as SEPA), the structural formula for the recurring unit for SPPA being:

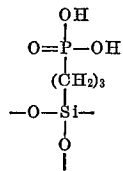

and for SEPA being:

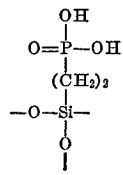

Advantages of these catalysts, in addition to those mentioned heretofore, are reduced corrosion in the system in which the catalyst is used and reduced process down-time because of improvements in stability and catalyst life.

Where desired, the polymer catalyst can be mounted on any suitable carrier by either of two methods. In the first method the solid catalyst is dissolved or suspended in a suitable medium, slurried with the carrier and the medium removed by evaporation. The supported catalyst is then dried further and roasted in a nitrogen atmosphere. In the second method, the polymer catalyst is prepared in situ by impregnating the carrier with a solution or suspension of the precursor, followed by hydrolysis with, e.g., concentrated hydrochloric acid, and roasting in a nitrogen atmosphere. Examples of carriers are silica gel, alumina, diatomaceous earth, titanium or other inert material.

The following examples illustrate the invention and also include the preparation of precursors and catalyst compositions. Conventional analytical techniques are followed.

EXAMPLE 1

Preparation of SEPA 300 grams (1 mol) of dimethyl(beta-triethoxysilylethyl)phosphonate is refluxed 8 hours with 600 grams conc. hydrochloric acid. The alcohols and water are removed by distillation in vacuo, and the light brown amorphous residue is dried in an oven at 100° C. A solid light-colored glass results. This is broken into lumps and further dried at 300° C. for 3 hours. Yield 144 grams. Two separate preparations have surface areas of 0.08 and 12.2 m.²/gram. Electrometric titration of a sample of the pulverized solid gave a curve with two half-equivalent points, at $pK_1=2.8$, $pK_2=7.65$. The product contains 5.04 meq./gram of acidity (theory=6.2 meq./gram).

Thermal stability of SEPA

A sample of SEPA catalyst is heated in a stream of nitrogen for 5 hours at 350° C. Titration of the heated sample gives $pK_1=2.4$ and an acid concentration of 5.86 meq./gram, 94.5 percent of the theoretical and higher than that of the original sample, indicating continued loss of water due to further polymerization.

A sample similarly heated one hour in air at 350° C. gives an acid content of 5.66 meq./gram, 91 percent of the theoretical. When heated 5 hours under the same conditions, the acid content is reduced to 4.65 meq./gram, 75 percent of theory. A small amount of liquid is evolved during this time. Titration proved it to be an acid having $pK_1=3.0$; $pK_2=8.1$, neutral equivalent 170.5.

EXAMPLE 2

Activity of SEPA in ethylene dehydration

The activity of the material SEPA as a catalyst for the dehydration of ethanol is determined in a conventional flow-recycle reactor. The construction of the reactor makes it possible to operate at very low degrees of conversion, so that the reaction rate is nearly constant throughout the catalyst bed and the reaction rate can be derived directly from the rate of formation of ethylene. The use of capillaries and placement of the gas-liquid interface in the region of high temperature gradients; i.e., at the lower end of the boiler, insures uniform evaporation of the reactant and eliminates bumping. The usual operating procedure is to bring the catalyst chamber to the desired temperature about 285° C. using atmospheric pressure and then to start the vaporization of alcohol. The vapors pass over the catalyst contained in a Pyrex dish which is heated in an electric resistance furnace. From the catalyst the vapors pass to a water condenser and then over a reboiler heated at a temperature so that any ethyl ether formed during the reaction will pass over to a trap immersed in a mixture of solid carbon dioxide and acetone where last traces of water, ethyl ether, and other low-boiling materials are removed. The gas evolution rates are measured by determining the pressure rise with a manometer while the gas is passing through a calibrated capillary.

The logarithm of the reaction rate, $\omega$, is plotted versus the inverse absolute temperature in accordance with the Arrhenius equation. The apparent energy of activation, E, in the Arrhenius equation is obtained by the plot:

$$E=2.303 \ R \ \frac{d(\log \omega)}{d(1/T)}$$

The reaction rate measured at lower temperatures of about 150° C. to about 300° C. where the Arrhenius plot is linear is the true surface reaction rate. Comparison of the Arrhenius plots of all catalysts tested, plotted to the same rate scale, would show the activity of any catalyst relative to another at any temperature in the range tested.

Relative to the activity of phosphoric acid on diatomaceous silica, a catalyst known in the art as valuable for the dehydration of alcohols and the hydration of ethylene, SEPA shows a dehydrating activity of 3.2 and 3.4 times in two tests under similar conditions at 285° C. Analysis of the organic products shows the absence of undersirable dehydrogenation or condensation activity in this catalyst. Similar results are obtained for SPPA.

EXAMPLE 3

Cohydrolysis of dimethyl(beta-triethoxysilylethyl) phosphonate with tetraethyl orthosilicate Ten grams each of the subject compounds are refluxed with 50 ml. of conc. hydrochloric acid for 6 hours. The solid copolymer is filtered and washed free of HCl with distilled water. It is dried overnight at 80° C. and further roasted in air at 300° C. for 8 hours. The surface area of the copolymer is 0.95 m.²/gram.

EXAMPLE 4

Hydrolysis of dimethyl(beta - triethoxysilylethyl)phosphonate in the presence of an anhydrous and particulate collodial silica Ten grams each of the subject materials are refluxed 6 hours with 100 ml. conc. hydrochloric acid. The solid product is dried overnight at 80° C., then roasted in air 4 hours at 300° C. Yield 15 grams of white solid; surface area 54.4 m.²/gram.

EXAMPLE 5

Preparation of 3-chloropropyltrichlorosilane

The compound is prepared by first, refluxing together a mixture of 38.2 grams (0.5 mol) allyl chloride, 67.2 grams (0.5 mol) trichlorosilane and 8.2 mgs. of chloroplatinic acid as catalyst. After the 35° C. initial reflux temperature increases to 65° C. (about one hour), a mixture of allyl chloride, 421 grams (6.1 mols) and trichlorosilane, 829 grams (5.5 mols) is added slowly over 8 hours controlling the reflux temperature in the range 65–80° C. During the reaction, volatile products are caught in traps cooled by Dry-Ice. At completion of the reactant feed, these trapped materials are warmed at 25° C. to expel propylene. The material not volatile at 25° C. is fed back to the reaction mixture at 80° C. Distillation gives 832 grams of product boiling at 118° C./94 mm., and having $n_D^{30}=1.4628$. The yield of 3-chloropropyltrichlorosilane is 65.2 percent of the theoretical. NMR analysis is consistent with the expected structure.

EXAMPLE 6

Distillation of 3-chloropropyltrichlorosilane

A reaction mixture (1293 grams) containing subject compound prepared by the platinum catalyzed addition of trichlorosilane to allyl chloride is fractionated on a 24″ x 1.5″ column packed with ¼″ stainless steel protruded packing. After a low-boiling fraction of propylene and alkyl chloride are removed, the product (595 grams) boiled constantly at 120° C./95 mm. and had $$n_D^{30}=1.4624.$$

EXAMPLE 7

Preparation of 3-chloropropyltrimethoxysilane

To 210 grams (6.6 mols) anhydrous methanol heated to 65° C. under an atmosphere of nitrogen, 224 grams (1.05 mols) of 3-chloropropyltrichlorosilane is added with stirring. The evolved hydrogen chloride is vented into the hood. Nitrogen is blown through the liquid for ½ hour after completion of the addition to remove the remaining HCl. Distillation on a 24″ x 1.5″ column filled with 3/16″ triple turn glass helices, gives a fraction boiling at 88° C./20 mm. and having $n_D^{30}=1.4172$. The yield is 52 percent of the theoretical.

The IR spectrum shows bands at 3.55 and 8.37 microns due to the O—CH₃ group, at 9.15 and 12.25 microns due to the Si—O—C grouping and at 14.57 and 15.8 microns due to C—Cl. The NMR spectrum in CDCl₃ showed a triplet at 9.25τ (2 protons) assigned to Si—CH₂, a pentet at 8.23τ (2 protons) assigned to —C—CH₂—C—, a triplet at 6.47τ (2 protons) assigned to —CH₂—Cl, and a singlet (9 protons) at 6.42τ due to —O—CH₃.

EXAMPLE 8

Preparation of 3-indopropyltrimethyloxysilane by halide exchange 19.8 grams (0.1 mol) of 3-chloropropyltrimethoxysilane and 15 grams of anhydrous sodium iodide are dissolved together in 100 ml. dry acetone and refluxed for 3 hours. The sodium chloride which precipitates is removed by filtration (6 grams), and the solvent is removed under vacuum. The liquid residue is distilled in a short-path apparatus giving 8 grams of material boiling at 83–90° C./ 4.0 mm., $n_D^{30}=1.4680$, and 6 grams of residue in the flask. The yield is 41.4 percent of the theoretical.

The infrared spectrum of the distilled material shows absorption bands at 3.4 microns (CH₃, CH₂), 3.55 microns (O—CH₃), 8.25 microns (Si—CH₂), 8.38 microns (Si—O—CH₃), 9.2 and 12.3 microns (Si—O—C) and a weak band at 19.9 microns (C—I), all consistent with the structure:

The H′—NMR spectrum displayed a multiplet at τ=9.28 (2 protons) assigned to Ⓑ, a pentet at 8.08 (2 protons) assigned to Ⓒ, a triplet at 6.78 (2 protons) Ⓓ, and a singlet, τ=6.42 (9 protons) assigned to Ⓐ.

EXAMPLE 9

Preparation of 3-bromopropyltrichlorosilane 60.5 grams (0.5 mol) allyl bromide, 67.2 grams (0.5 mol) trichlorosilane and 6.4 mgs. of chloroplatinic acid hexahydrate are refluxed together. The reflux temperature remains at 42° C. Addition of 6 mgs. additional chloroplatinic acid and refluxing 4 hours more does not initiate reaction. Finally 5.8 mgs. additional chloroplatinic acid dissolved in 0.5 ml. water is added. After a short time, the material is subjected to GLC. This shows two peaks due to allyl bromide and product. After refluxing a further 4½ hours, the temperature increases to 79° C. Then a mixture of 829 grams (6.1 mols) trichlorosilane and 665 grams (5.5 mols) of allyl bromide is added over a period of about 11 hours at about 80° C. The vaporized material is caught in a cold-trap and recycled as previously. After one additional hour reflux, all the material reacts. The crude product is filtered and distilled on a 1½″ x 24″ fractionating column. 980 grams of product (64 percent of theory) boiling at 88° C./10 mm., $$n_D^{30}=1.4880$$

is obtained.

The infrared spectrum of the product shows bands at 3.36 microns (CH₂), 8.07 microns (CH₂—Br), 14.4 microns (Si—Cl) and 15.75 microns (C—Br) consistent with the expected structure. The H′—NMR spectrum gave peaks at τ=8.45 (2 protons) assigned to Ⓐ, τ=7.88 (2 protons) Ⓑ, and τ=6.54 (2 protons), Ⓒ, consistent with the expected structure.

EXAMPLE 10

Preparation of 3-bromopropyltrimethoxysilane (A) 256 grams (1 mol) of 3-bromopropyltrichlorosilane is heated to 65° with stirring while adding 190 grams (5.94 mols) of anhydrous methanol dropwise over 2 hours. The mixture is refluxed ½ hour while nitrogen is blown through the liquid to remove hydrogen chloride. The product is distilled on a 1½″ x 24″ glass-helix-packed column giving two fractions: (I) B.P. 92° C./10 mm.; $n_D^{30}$ 1.4362, 71 grams and (II) B.P. 152° C./1.5 mm.; $n_D^{30}$ 1.4550, 71 grams.

The NMR spectrum of compound I shows a singlet (9 protons) at τ=6.42, a triplet (2 protons) centered at 6.57, a multiplet (2 protons) centered at 8.05, and a multiplet (2 protons) centered at 9.28 consistent with the expected structure.

The NMR spectrum of compound II shows a singlet (6 protons) at τ=6.6, a triplet (2 protons) at 6.7, and multiplets (2 protons each) at 8.2 and 9.33. The infrared spectrum is the same as for compound I except for less intensity of the band at 6.95 microns and 10.0 microns due to CH₃—O and the presence of a new band at 14.4 microns (Si—Cl) also in 3-bromopropyltrichlorosilane. Compound II is 3-bromopropyldimethoxychlorosilane, BrCH₂CH₂CH₂SiCl(OCH₃)₂.

9

(B) With hydrogen chloride acceptor: 256 grams (1 mol) of 3-bromopropyltrichlorosilane is dissolved in 1000 ml. dry benzene in a 3-necked flask equipped with stirrer, addition funnel, thermometer, reflux condenser and nitrogen gas inlet. The solution is heated to 65° C. and air dsiplaced from the flask with dry nitrogen. A mixture of 237 grams (3 mols) pyridine and 96 grams (3 mols) anhydrous methanol is added dropwise over 2½ hours. Pyridine hydrochloride separates from solution as the reaction progresses. After heating one hour, the mixture is cooled and filtered. The filter cake is washed with additional dry benzene. The combined filtrates are washed twice with 500 ml. of ice water, then dried over anhydrous sodium sulfate. Distillation of the solution gives a fraction of 178 grams boiling at 94° C./10 mm., $n_D^{30}=1.4368$. The NMR spectrum of this material is identical to compound I above, yield 73.3 percent.

EXAMPLE 11

Preparation of dialkylphosphonopropyltrialkoxysilanes (A) By reaction of sodium diethylphosphite and 3-bromopropyltrimethoxysilane.—Diethylphosphite, 27.6 grams (0.2 mol) is added dropwise during 5 hours to a suspension of 4.6 grams (0.2 g. atom) of sodium in 300 ml. tetrahydrofuran at 65° C. At the end of this time, all of the metal is dissolved. 3-Bromopropyltrimethoxysilane, 48.6 grams (0.19 mol) is added over 40 minutes with stirring to the sodium diethylphosphite solution. The reaction mixture is stirred for 6 hours at 65° C. The separated sodium bromide is filtered off and the filtrate distilled. A fraction of 22 grams boiling from 43–45° C./ 0.2 mm., $n_D^{30}=1.4332$, proves to be unreacted 3-bromopropyltrimethoxysilane. A second fraction of 24 grams (17% yield), boiling from 110–115° C./0.2 mm., $n_D^{30}=1.4270$, is obtained. The H'NMR spectrum of this fraction showed a triplet at $\tau=9.48$ (2 protons) Ⓑ, a triplet $\tau=8.90$ (about 7 protons) Ⓕ, a multiplet near $\tau=8.5$ (4 protons) ⒸⒸ plus ⒹⒹ, a singlet (9 protons) at $\tau=6.66$ Ⓐ, and a pentet at $\tau=6.2$ ⒺⒺ, consistent with the structure,

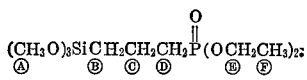

There is also evident in the spectrum a triplet peak 2 c.p.s. unfield from ⒻⒻ, and a quadruplet at $\tau=6.5$ overlapping the pentet ⒺⒺ. The latter may be from an impurity with the grouping Si—O—CH₂—. This quadruplet plus ⒺⒺ totalled about 6 protons. Examination of the fraction by GLC shows at least five separate peaks and shoulders, demonstrating that the reaction is not a clean and simple one.

(B) Arbuzov reaction of 3-bromopropyltrimethoxysilane and trimethylphosphite: 3-bromopropyltrimethoxysilane, 61 grams (0.25 mol) is heated under nitrogen to 150° C. with stirring. Trimethylphosphite, 31 grams (0.25 mol) is added dropwise to the hot liquid. The unreacted phosphite distilling out is condensed and refed in a time of 1¼ hours. The liquid is heated an additional 2 hours at 150–160° C. Distillation through a 1″ x 10″ column gives a fraction of material, 44 grams, B.P. 113° C./1.0 mm., $n_D^{30}=1.4310$. The material is redistilled in an 8-inch x 15 mm. Vigreaux column, but is still impure by GLC.

The major peak of the GLC spectrum is collected and rechromatographed. It now displays homogeneity. The H'—NMR of this material gives a triplet (2 protons) at $\tau=9.3$ assigned to protons ⒷⒷ, a doublet, J=17 c.p.s., (3 protons) centered at 8.56, ⒻⒻ, a multiplet (2 protons) centered at 8.22, ⒹⒹ, a singlet (3 protons) at 6.47, ⒻⒻ, a doublet, J=12 c.p.s. (3 protons) centered near 6.31, Ⓐ, and a triplet (2 protons) centered at 6.05 ⒸⒸ. The partial structure best fitting this information is:

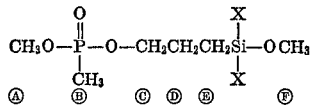

where X=halogen, —OH.

(C) Addition of diethylphosphite to allyltriethoxysilane using di-tertiarybutyl peroxide.—A mixture of 204 grams (1 mol) of allyltriethoxysilane and 19.2 grams of di-t-butyl peroxide is slowly added (1 hr.) to 138 grams (1 mol) or diethylhydrogenphosphite with stirring and heating to 140° C. in a nitrogen atmosphere. The mixture is heated one hour at 160° C. after completion of the addition. Upon distillation 114 grams of a material boiling at 149° C./1.8 mm., $n_D^{30}=1.4252$, is obtained. The infrared spectrum of this material shows absorption bands at 3.34 microns (—CH₃), 3.39, 3.42 (—CH₂—), a shoulder at 3.62 (—OCH₂—), 7.2 (C—CH₃), 8.1 (P=O), 8.55 (Si—O—CH₂—), bands at 8.07, 8.25 and 8.7 microns probably due to the groupings (P—O—C), (—OCH₂—), and (Si—C—), 10.48 (P—O), and 11.95 and 12.82 microns due to the groupings (Si—O—C—) and (P—O—C) in the molecule.

The H'—NMR spectrum is complex showing a triplet peak at $\tau=9.3$ (2 protons) assigned to ⒸⒸ. Overlapping triplet peaks at 8.8 and 8.7 (total 15 protons), assigned to Ⓐ and ⒼⒼ, a multiplet at 8.3 (4 protons) assigned to ⒹⒹ plus ⒺⒺ, and a complex multiplet from 6.7–5.75 (10 protons) assigned to ⒷⒷ + ⒻⒻ.

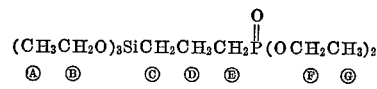

EXAMPLE 12

Hydrolysis of diethylphosphonopropyltriethoxysilane

The title compound, 111 grams (0.325 mol) and 222 grams of concentrated hydrochloric acid are refluxed together for 5 hours. The liquid is then evaporated off and the remaining solid dried at 100° C. for 24 hours, and finally roasted at 300° C. in a tube furnace under a nitrogen atmosphere. A white frothy solid is obtained weighing 51 grams (90 percent of theoretical). The product poly-3-phosphonopropylpolysilsesquioxane, SPPA, had an elemental analysis: Carbon 19.11% found, 20.50% theor. for

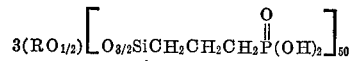

hydrogen 4.19% found, 4.62% theor., phosphorous 17.59% found, 17.63% theor., silicon 16.03% found, 15.98% theor. It has an infrared spectrum in KBr characteristic of a phosphonic acid. The surface area by nitrogen adsorption is 1.3 meters²/gram. Electrometric titration of the material showed it to be a dibasic acid $pK_1=2.45$, $pK_2\approx7.3$ with an acid capacity of 5.06 meq./gram (theory =5.69 meq./gram). Acidimetric titration shows no acidity extractable by cold water and a total acidity of 5.32 meq./gram.

Thermal stability of SPPA

A finely powdered sample of the above material is heated in a tube furnace at 350° C. for 5 hours while passing a slow purge of purified nitrogen over the compound and through scrubbers containing 0.1 N NaOH solution. Titration of the unneutralized base in the scrubbers indicates a loss of only 0.17 meq./gram, or 3.2 percent of the total acidity of the SPPA catalyst.

EXAMPLE 13

(A) Cohydrolysis of diethylphosphonopropyltriethoxysilane and tetraethylorthosilicate A mixture of 34 grams (0.1 mol) of the SPPA precursor, Example 11C, 21 grams (0.1 mol) of tetraethylorthosilicate and 100 ml. of conc. HCl are refluxed 2 hours. The resulting viscous syrup is dried at 140° C. in an oven for 18 hours, and roasted 3 hours at 300° C. under a nitrogen atmosphere in a tube furnace. Twenty grams of a white spongy solid is obtained. Analyses show no extractable acidity and 3.3 meq./gram of total acidity (58 percent SPPA content). It is found to be active as an ethanol dehydration catalyst.

(B) SPPA supported on diatomaceous earth

Diethylphosphonopropyltriethoxysilane, 34 grams (0.1 mol) and diatomaceous earth, 34 grams are heated at 80° C. with 300 ml. of 12% HCl for 2½ hours. The liquid and suspended solids are dried in an open dish at 140° C. The product is a heterogeneous mixture of SPPA and diatomaceous earth.

Repetition of this using 1.5 grams of diethylphosphonopropyltriethoxysilane and 150 grams of diatomaceous earth gave a homogeneous orange powder, active in the dehydration of ethanol to ethylene.

Abbreviations used in the foregoing examples have the following conventional meanings: g.=gram; b.p. or B.P. =boiling point; mm.=millimeter(s); NMR or H'NMR =proton nuclear magnetic resonance spectroscopy; meq.=milliequivalents; ml.= milliliter; J=coupling constant; c.p.s.=cycles per second; M²=square meters; $pK_1$ and $pK_2$=negative logarithms of the first and second ionization constants: conc.=concentrated; "=inches; $\tau$= chemical shift in parts per million relative to tetramethylsilane equal to 10; GLC=gas-liquid chromatography; mgs.=milligrams; IR=infrared; %=percent.

We claim:

1. A process for the dehydration of an alcohol having an alpha hydrogen and 2 to 18 carbon atoms in its molecular structure comprising vaporizing said alcohol in the presence of a non-linear polymer catalyst composition consisting essentially of recurring units having the following structural formula:

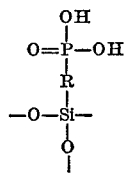

wherein R is an unsubstituted or substituted straight or branched chain divalent saturated alkylene radical having 2 to 10 carbon atoms or an unsubstituted or substituted divalent aryl radical having 1 to 3 benzene rings wherein the substituents for the alkylene radical can be halogen or a phenyl radical and the substitutents for the aryl radical can be halogen or straight or branched chain saturated alkyl radicals having 1 to 5 carbon atoms; and recovering at least one olefin having 2 to 18 carbon atoms in its molecular structure.

2. The process defined in claim 1 wherein the defined polymer contains about 1 to 20 mol percent of cross-linking units having the following structural formula:

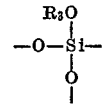

wherein R³ is hydrogen or an unsubstituted or substituted straight or branched chain or cycloc monovalent saturated alkyl radical having 1 to 10 carbon atoms or an unsubstituted or substituted monovalent aryl radical having 1 to 3 benzene rings wherein the substituents for the alkyl radical can be halogen or a phenyl radical and the substituents for the aryl radical can be halogen or straight or branched chain saturated alkyl radicals having 1 to 5 carbon atoms, said units being randomly interspersed among the units of the polymer to provide cross-linking.

3. The process defined in claim 2 wherein the defined polymer contains about 5 to 15 mol percent of said cross-linking units.

4. The process defined in claim 1 wherein the polymer is poly-3-phosphonopropylpolysilsesquioxane.

5. The process defined in claim 1 wherein the polymer is poly-3-phosphonoethylpolysilsesquioxane.

6. The process defined in claim 1 wherein the alcohol is ethanol.

7. The process defined in claim 2 wherein the alcohol is ethanol.

8. The process defined in claim 4 wherein the alcohol is ethanol.

9. The process defined in claim 5 wherein the alcohol is ethanol.

References Cited

UNITED STATES PATENTS

| | | | |
|---|---|---|---|
| 2,916,528 | 12/1959 | Jones et al. | 260—682 |
| 3,328,471 | 6/1967 | Kronig et al. | 260—682 |
| 3,510,538 | 5/1970 | Rosenthal | 260—682 |

DELBERT E. GANTZ, Primary Examiner

C. E. SPRESSER, Jr., Assistant Examiner

U.S. Cl. X.R.

252—437; 260—666 A, 668 R, 681